Nov. 17, 1959 W. R. JOHNSON 2,913,520

METHOD OF MAGNETICALLY RECORDING AND REPRODUCING TELEVISION SIGNALS

Filed Dec. 5, 1955 5 Sheets-Sheet 1

INVENTOR.
WAYNE R. JOHNSON
BY
Lippincott & Smith
ATTORNEYS

Nov. 17, 1959 W. R. JOHNSON 2,913,520

METHOD OF MAGNETICALLY RECORDING AND REPRODUCING TELEVISION SIGNALS

Filed Dec. 5, 1955 5 Sheets-Sheet 2

INVENTOR.
WAYNE R. JOHNSON
BY
Lippincott & Smith
ATTORNEYS

Nov. 17, 1959 W. R. JOHNSON 2,913,520

METHOD OF MAGNETICALLY RECORDING AND REPRODUCING TELEVISION SIGNALS

Filed Dec. 5, 1955 5 Sheets-Sheet 3

INVENTOR.
WAYNE R. JOHNSON

BY Lippincott & Smith

ATTORNEYS

INVENTOR.
WAYNE R. JOHNSON
BY Lippincott & Smith
ATTORNEYS

INVENTOR.
WAYNE R. JOHNSON
BY
Lippincott & Smith
ATTORNEYS

United States Patent Office 2,913,520

Patented Nov. 17, 1959

2,913,520

METHOD OF MAGNETICALLY RECORDING AND REPRODUCING TELEVISION SIGNALS

Wayne R. Johnson, Los Angeles, Calif., assignor, by mesne assignments, to Minnesota Mining & Manufacturing Co., St. Paul, Minn., a corporation of Delaware Application December 5, 1955, Serial No. 550,894

9 Claims. (Cl. 178—6.6)

This invention relates to methods of magnetically recording and reproducing television signals so as to extend the range of frequencies which can satisfactorily be reproduced.

It is well known that in magnetic recording processes there are both upper and lower limits to the frequency bands which can be reproduced without material amplitude distortion. The amplitude of the reproduced signals varies as a direct function of the rate of change of flux in the pickup transducer head. This rate of change depends upon a number of factors; the speed of the recording medium, the effective width of the gap in the transducer head in comparison with the recorded wavelengths of the frequencies to be reproduced, and the amplitude of those signals as represented by the intensity of magnetization imposed upon the recording medium. There is a theoretical absolute cutoff frequency where the record wavelength is equal to the width of the gap, the signals falling off with increased frequency owing to "aperture effect" which is expressed by the function $$A=K\frac{\sin X}{X}$$

where A is the amplitude of the reproduced signals, X is equal to one-half of that portion of the wavelength of $2\pi$ which is subtended by the width of the reproducing gap, and K is a factor involving speed and magnetization of the record. Circuits are known for equalizing this aperture effect distortion of the reproduced signals, up to very nearly the cutoff frequency. "Peaking coils" can be introduced into either the recording or the reproducing circuits to accomplish this.

A much more serious difficulty in the case of reproducing the very wide band of frequencies comprised in the television signals is due to the effect of the varying frequency on the rate of change of magnetization of that portion of the tape customarily used as the recording medium which is spanned by the gap in the transducer head. For any magnetization of the tape varying in the gap, as $M \sin \omega t$, the amplitude of the reproduced signal will vary as the first derivative, making the amplitude of the reproduced signal proportional to $M\omega \cos \omega t$. Hence, if it be assumed that the current in the recording head and the resulting magnetization are directly proportional to the amplitude of the input signals, the reproduced signals will vary in amplitude directly with frequency.

Theoretically television signals contain a band of frequencies extending from direct current or zero frequency up to approximately 4 megacycles per second, in accordance with present standards of transmission. Various methods are known of dividing this band of frequencies, but in one preferred method the frequencies to be recorded still extend from the theoretical zero up to somewhere in the neighborhood of 2 megacycles. The zero frequency component cannot be directly reproduced magnetically, but it is ordinarily re-established through through the use of a D.C. restorer, as in the case of most television receivers. The important frequencies which must be reproduced therefore extend down to the field frequency of 60 cycles per second (with an almost negligible component of the frame frequency of 30 cycles) up to the approximately 2 megacycles that the method of recording herein considered contemplates. Assuming full correction of the aperture effect, this is a range in frequency and therefore in amplitude, for signals of equal intensities at the highest and lowest frequencies involved, of over 33,333 to 1. The dynamic range of good magnetic tape is about 60 db or 1,000 to 1 in amplitude for sound recording, but the special requirements of television recording restrict its dynamic range to 30 to 35 db or only from about 30:1 to 55:1 in amplitude.

In most magnetic recording and reproducing processes equalization is obtained by passing the reproduced signals into an integrating circuit. As the expression above given shows, the magnetic playback process advances the phase of the recorded signals by 90 electrical degrees as well as increasing their amplitudes proportionally to the frequency. Integration in the playback amplifier retards the frequency by 90 degrees and divides by the frequency, so over the range where such integration is feasible highly satisfactory reproduction of the original signals is possible. With television signals extending down to a very low frequency range, however, there is a limit to which such integration equalization can be carried. The amplification of the low frequencies must be carried so far in order to obtain a reasonable rate of change in the gap that noise frequencies, which are ordinarily relatively high, quite overpower the low frequency components. Experience shows, however, that equalization down to, say, 10,000 cycles in this manner is quite feasible, even though the difference in amplitude in the range between 10 kc. and 2 mc. involves a variation in relative amplitude of over 46 db, or 200 to 1 in voltage.

Under circumstances of the same general type it is quite customary to "pre-emphasize" the low frequency signals. The 10,000 kc. frequency is approximately the geometric mean of the frequencies considered in the example here discussed. To pre-emphasize a 50 cycle signal to the point where it could be played back at the same level as a 10,000 cycle signal (assuming that the playback amplifier is substantially level between 50 cycles and 10 kc.) would require the amplitude of the 60 cycle frequency to be nearly 200 times that of the 10 kc. signal This would oversaturate the best magnetic tapes available for picture recording.

The primary purpose of the present invention is to overcome these limitations. More specifically, among the objects of the present invention are to provide a method of recording and reproducing television and like signals which permits compensation of the low frequencies down to frame or field frequencies or even below; to provide a method of compensation of the low frequencies which can be matched with almost perfect exactitude to a playback amplifier of the integrating-compensation type; to provide a method of pre-emphasizing recorded signals which reduces the dynamic range of the recording medium by only a relatively few db; to provide a method of recording and reproduction of television signals which preserves the relative phase relationship of the component frequencies throughout the entire range of compensation; to provide a method of compensation of wideband signals wherein the low frequency limit of compensation may be restricted or extended at will, in accordance with the requirements of equipment preceding or following the recording and playback equipment, i.e., so that the low frequency cut-off of the system as a whole may be reduced by an octave or two or by many octaves; and to provide a method of low frequency compensation which does not require a materially greater range of input amplification than that normally employed in developing signals to be recorded in the conventional manner.

The invention utilizes the fact that in television signals, as transmitted in accordance with the standards in effect in both the United States and in foreign countries, there are interspersed with the signals representative of the illumination of the various areas of the picture actually to be reproduced, blanking pulses whose amplitude is representative of zero illumination. Signals having these characteristics are supplied to a distorting circuit which, in effect, divides the wave into two parts, one of which is amplified linearly, the other in inverse proportion to its frequency. This can be done in two separate amplifiers, and the two parts combined after amplification. Preferably, because more simply, a single amplifier tube of very high output impedance, such as a pentode, is employed, which delivers an output current substantially directly proportional to the voltage of the input signal. This amplifier feeds a partially integrating circuit, comprising, essentially (although it may have other branches) a condenser and resistor in series, the values of these two components being so chosen that at the low cutoff frequency, to which the playback amplifier is equalized, the effective capacitive and resistive impedance of the two circuit elements of the recording amplifier are substantially equal. The voltage developed across this circuit supplies a second amplifier which is A.C. coupled, to eliminate any D.C. component therefrom, so that the frequencies supplied to the recording head or transducer oscillate, from positive to negative, around a mean or zero axis. The voltage across the partially integrating circuit is that which drives this final amplifier. The low frequencies, within the range of the frame frequencies, would produce a negligible voltage drop across the resistive element of this partially integrating circuit, but, as far as the circuit has been described at this point, would charge the condenser to a voltage of a hundred times or more that which would be developed across the resistor for a signal of high frequency and equal amplitude. During each blanking period, however, the zero axis of the signal supplied to the final tube is re-established so as to bring the level of the blanking pulse back to the same voltage as before the start of the integrating process. Considering the component of field frequency, instead of a charge on the condenser building up for a half cycle or 1/120 of a second, it will build up at the same relative rates, for a maximum period of only 54½ microseconds, i.e., that between the end of one blanking pulse and the beginning of the next. If a lesser degree of compensation is desired the condenser is effectively shunted by a resistor the ohmage of which is equal to that of the condenser at the new low frequency cut-off. In the playback amplifier compensation is accomplished in circuits which complement the partially integrating circuit of the recording apparatus; effectively they comprise resistances and capacitances in parallel. Reestablishment of the zero level in the recording may create spurious pulses, but these are clipped out in the playback amplifier, the signal is clamped at the proper zero level and the result is a signal which is compensated down to the desired low frequency limit and is substantially without phase distortion.

Several forms of apparatus in which the above described steps may be accomplished will be described and are illustrated in detail in the accompanying drawings wherein.

Figure 1:
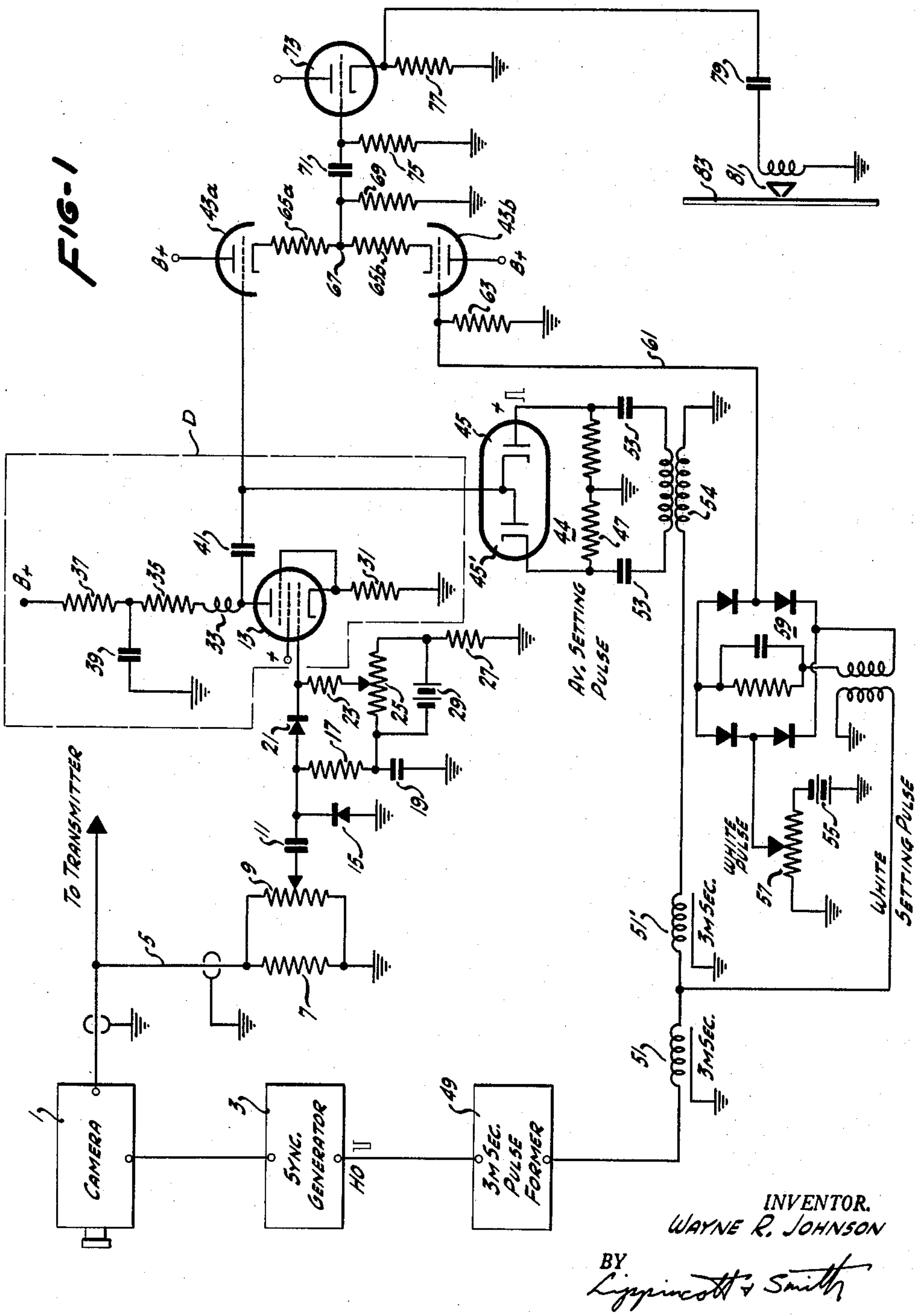
Fig. 1 is a schematic diagram which shows one form of amplifier for accomplishing the steps in the method of this invention involved in recording the signals.

In describing the method of this invention as effected by the apparatus illustrated in Fig. 1, the signal to be recorded is assumed to be that developed by a commercial type television camera 1 which is supplied with its scanning, blanking, and synchronizing signals from a conventional sync generator 3. It is assumed that the signal is being transmitted simultaneously with its recording for later transmission over the same or other station, and therefore that synchronizing as well as blanking pulses are present in the signal to be recorded. The signals could, of course, emanate from a distant transmitter and be received over a coaxial line, or be picked up from either a commercial television station or a remote pickup. In any of these cases, both synchronizing and blanking signals will be present. If the signals are locally generated for recording only, so that synchronizing pulses need not be inserted in the signal, the apparatus to be described can be slightly simplified, as will be described in connection with the specific equipment thus affected. Since the source of the signals to be operated upon is not directly related to the present invention it is shown in highly symbolic form. Moreover, it is also assumed that in the system of which this particular equipment forms a part, compensation down to two or three octaves below the play-back cut-off is adequate. This permits some simplification of the apparatus; equipment for compensation down to field or frame frequencies will be described hereinafter.

The signals to be recorded, from whatever source derived, are indicated as supplied through a coaxial lead 5 to a level adjuster comprising, in the present case, a fixed resistor 7 in parallel with a gain-control potentiometer 9, the movable contact of the gain control connecting to a blocking condenser 11, which connects, in turn, to the control grid of an amplifier tube 13. This tube is preferably a pentode or other suitable type having very high plate impedance, of the order of megohms, so that its anode current is substantially proportional to its input voltage, irrespective of the load in the anode circuit, and its amplification is therefore substantially directly proportional to its load impedance.

Between condenser 11 and the control grid of the tube 13 there is connected a D.C. restorer and a clipping circuit for removing the synchronizing pulses in the signals.

As supplied to the equipment illustrated, zero illumination, the level of which is indicated by the blanking pulses, is represented by negative signals, the synchronizing pulses being "blacker than black." Restoration of the D.C. component is supplied by a rectifier 15 connecting from the condenser 11 to ground and so poled as to pass and effectively short negative signals to ground, thus charging condenser 11 positively when the input voltage swings back to its average value and thus setting the average potential of the grid positive, with respect to ground, by the amount of the maximum negative swing of the input signals.

The clipping circuit for removing that portion of the negative pulse which exceeds the blanking level comprises a shunt circuit connecting to ground from the output side of condenser 11 which includes a resistor 17 and condenser 19 connected in series. Following this shunt path, a rectifier 21, poled to pass positive signals, is connected in series with the grid of tube 13. Between the rectifier and the grid there is connected a biasing circuit which includes a high ohmage leak resistor 23 which connects to the movable contact of a potentiometer 25, connecting from the junction between resistor 17 and condenser 19 to another leak resistor 27 connecting to ground. The biasing source 29 connects across the potentiometer 25.

The D.C. restorer 15 charges condenser 19 to very nearly the same positive potential as condenser 11, the resistor 17 being relatively low in resistance in comparison with resistor 27. Resistor 23, again, is relatively high in value. Through this latter resistor there is applied to the grid of tube 13 and the output side of rectifier 21 a voltage which can be adjusted by means of the potentiometer 25 to equal the difference between black level and the extreme negative value of the synchronizing pulses. The time constant of the circuit including condensers 11 and 19 and the leak resistors 17 and 27 is preferably made quite long in comparison with the period of the line frequency, so that the potential applied from condenser 11 to the rectifier 21 due to the charge stored on these condensers is sensibly constant between synchronizing pulses. Rectifier 21 therefore conducts until the voltage due to the condenser charge is equal to the voltage drop across the potentiometer 25 from condenser 19 to the movable contact of the potentiometer. At this point conduction ceases and the potential of the grid remains constant, until the signal voltage again rises above that at which conduction ceased. The bias voltage set on the potentiometer is made equal to the amplitude of the synchronizing pulses. As supplied to the control grid of tube 13 the signal therefore includes the picture and blanking pulses only, the synchronizing pulses being clipped out. Other known forms of clipping circuits may be employed, and, in fact, no clipping circuit is strictly necessary, but clipping is desirable since it conserves dynamic range of the recording medium and thereby extends the range in frequency to which compensation may be effected with tubes of a given distortionless output capacity.

Tube 13 is, as stated above, one having very high dynamic impedance, such as the pentode shown. It is provided with the usual cathode resistor 31 for biasing the cathode and is supplied with screen grid and anode potentials from a suitable source, not shown.

The anode circuit of tube 13 constitutes the low-frequency compensating circuit proper. Reading from the tube anode to B+, this circuit comprises a small inductance or peaking coil 33, a resistor 35 and a second resistor 37, with a condenser 39 connecting from the junction of the two resistors either to ground, as shown, or to B+. The peaking coil 33 is for the purpose of compensating the "aperture effect" of the playback transducer; this effect is responsible for the high frequency cut-off of magnetic equipment of this character. At the frequencies compensated in accordance with this invention the impedance of coil 33 can be entirely neglected in comparison with that of resistors 35 and 37. In the ensuing discussion these resistors will therefore be treated as though they were the only series elements between the anode and B+ as, in effect, they are.

The highest frequency at which the compensator begins to take effect is determined by the time constant of the combination comprising resistor 35 and condenser 39; the low frequency limit to which compensation is carried is determined by the time constant of condenser 39 in combination with resistor 37.

In considering the operation of the circuit it may be assumed, for illustrative purposes, that the playback amplifier is integration-equalized down to a cutoff frequency of 10 kc.; i.e., that at 10 kc. signals are reproduced at a level 3 db below signals of materially higher frequency, recorded at the same level of magnetization, the level of reproduction falling off at approximately 6 db per octave below the cutoff frequency. To provide the proper low-frequency compensation the output of amplifier 13 must therefore be up 3 db at 10 kc., rising approximately 6 db per octave throughout the range for which compensation is provided. Above 10 kilocycles the output of the amplifier falls as that of the playback amplifier rises, assuming a substantially constant value throughout the upper portion of the band to be recorded and reproduced.

Taking the cutoff of the playback amplifier, therefore, at 10 kc., a reasonable value for the resistor 35 would be approximately 2,000 ohms. The condenser 39 is selected so that at the cutoff frequency its reactive impedance is equal to the resistive impedance of resistor 35. In the illustrative case this would require a capacity of 0.008 microfarad.

Resistor 37 is chosen to provide the low-frequency limit of compensation, which may be defined as the frequency at which the overall response of the system is 3 db down. Thus, if it is deemed necessary to carry the low-frequency compensation only about a single octave below that provided by the playback amplifier, the resistor 37 may be equal in value to resistor 35. If it be desired to carry the low-frequency compensation two octaves lower than that provided by the playback or down to 2500 cycles, resistor 37 should have about four times the value of resistor 35, or 8,000 ohms, and so on, the resistance of resistor 37 increasing in inverse proportion to the desired lower cutoff frequency. It may be noted here that equalization to frequencies whose period is equal to several lines of the horizontal scanning frequency may be ample to give satisfactory results; the very low frequencies in a recorded picture can be followed and supplied by the D.C. restorer in the playback amplifier if its time constant is short enough, say, equal to the period of a few lines only.

The voltage supplied to the anode circuit at B+ is preferably high enough so that, when the tube is drawing its normal anode current as set by the D.C. restorer and the cathode bias resistor 31, the potential at the junction of resistors 37 and 35 is equal to a normal or recommended anode potential for the tube. Condenser 39 will then assume, on the average, this anode potential.

The principles of operation of the circuit will best be understood by assuming that it is desired to record a frequency at which the impedance of resistor 37 is high in comparison with that of condenser 39. The low frequency considered will swing the grid alternately positive and negative, and because of the high dynamic impedance of the tube the current in the anode-cathode circuit will vary substantially directly in proportion to the variation in grid voltage. Because the impedance of the condenser 39 is low in comparison with that of resistor 37, the path of the alternating component from anode to ground and back to the cathode is primarily through the condenser. Stated in another fashion, on positive grid swings the tube 13 discharges the condenser much more rapidly than the charge can be replaced through resistor 37, and the drop in potential of the anode is equal to that due to the discharge of the condenser plus that due to the resistive drop through resistor 35. For very low frequencies the drop through resistor 35 is negligible in comparison with that due to condenser discharge. The potential on the plate continues to fall as the grid voltage rises (or remains high) until the junction of the condenser with the resistor 37 has dropped so low in comparison with B+ that resistor 37 can supply all the required plate current. Where the decrease in potential due to condenser charge and that due to voltage drop through resistor 37 become equal the compensation will be 3 db down; i.e., the output of the playback amplifier at this frequency will be only of about 70% of the amplitude of higher frequency components of equal input amplitude. When the grid of tube 13 swings negative the condenser 35 charges instead of discharging, integrating the signal in opposite phase.

Thus far the process described is a simple, pre-recording integration. If, however, the signals were to be recorded directly the intensity of magnetization imposed upon the tape would be very high indeed, using up a great proportion of the dynamic range of the tape and greatly limiting the distortionless output power of the recording-reproducing system. The advantage of the present invention is that it so operates upon the signal that the build-up of magnetization of the tape is only that which occurs during one line of horizontal scanning.

This operation is accomplished in the portion of the output circuit of tube 13 that supplies the next stage of amplification. The voltage drop across the compensating circuit is taken off from the anode of tube 13 through a blocking condenser 41, which filters out the D.C. component of the anode voltage, and is connected directly to the grid of a cathode-follower triode 43*a*, which is conveniently one section of a dual tube, since it preferably forms one arm of an adding circuit, as will be described below. Triode 43*a* is not provided with the usual grid resistor; instead the grid is periodically grounded, during the blanking period at the end of each line, by a clamp circuit 44. This is illustrated as being of the well-known type comprising a pair of diode elements 45, 45', connected in series, with the anode of the first connected to the cathode of the second. A resistor 47, having a center tap grounded, is bridged across the two diode sections. This arrangement effectively connects the grid of tube 43*a* to ground when a positive pulse is applied to the anode of tube 45. Other types of electronic switch for closing the circuit from the grid of tube 43 to ground may be employed, but the one shown is one of the simplest.

Pulses for operating the clamp circuit are shown as being derived from the sync generator 3, although where the signal to be recorded is not locally generated the pulses used may be derived by means of conventional sync separation circuits from the received signal. The horizontal drive pulse from the sync generator is supplied to a pulse former 49. This may, for example, be a monostable or "one-shot" multivibrator, which, in this case, is triggered by the leading edge of the horizontal drive pulse and generates a shorter pulse of 3 microseconds duration. This 3 microsecond pulse is transmitted through two delay line sections and applied to the clamp through condensers 53. The clamp is therefore closed, grounding the grid of tube 43, during the final third of the 9 microsecond (very approximately) blanking pulse.

As a result of this arrangement, instead of the currents which magnetize the tape constantly increasing during the period when condenser 39 is charging, they are brought back to zero level at the end of each line, the clamp 44 effectively setting a new zero axis, about which the higher frequencies oscillate, each time the clamp operates. The rate-of-change of the magnetization on the tape remains the same as though the full increase in voltage had been applied to develop magnetization of the tape. This rate of change, however, continues for only a maximum of one line period, instead of a period many times as long. The result is that only a few db of the dynamic range of the tape are consumed in supplying the low frequency components of the signal.

In the particular system here described it is desired also to add to the recording signal a pulse indicative of the maximum white level signal to be recorded. This is supplied through an adding circuit comprising the second half of section 43*b* of the tube 43. One way of applying the white level pulse to the grid of this tube is indicated, but it is to be understood that other ways are known which would accomplish the same purpose and that shown is one chosen merely for purposes of illustration. Since it has been assumed that the signal has been delivered to the grid of tube 13 with positive signals indicating white, and has been reversed in polarity at the plate of tube 13, the white-level pulse must be negative. This pulse represents the total maximum change in amplitude, with respect to black, of the recorded signals. It is inserted when the signals themselves are at black level. A negative pulse of constant amplitude, inserted at this point, will therefore give the desired maximum-amplitude difference between black and white levels.

Accordingly there is provided a source of D.C. potential, such as the battery 55, which has its positive terminal grounded and its negative terminal connected to a potentiometer 57 and thence back to ground. The movable contact of this potentiometer may be set to a potential negative to ground by the amount of the desired pulse amplitude, in comparison with the level of the signal at the grid of triode 43*a*. The potentiometer contact connects through a conventional electronic switch 59, to the grid of the dual triode section 43*b* through a lead 61. The usual high resistance grid resistor 63 is provided to maintain the grid bias of this tube at the desired level. Electronic switch 59 is normally open; it is closed by 3 microsecond pulses from the pulse former 49, delayed by 3 microseconds through section 51 of the delay line. In place of the usual 9 microsecond blanking pulse, the recorded signals therefore have, first, a 3 microsecond pulse indicative of black level, then another 3 microsecond pulse indicative of white level, and finally a 3 microsecond pulse nominally representative of average level, although the important thing about this latter pulse is the interval in which it occurs rather than the level which it actually shows, since the grounding of the grid of triode 43*a* will usually develop an additional spurious pulse in one direction or the other.

The two sections of tube 43 constitute, together, an adding circuit of known type. Connected to the respective cathodes of the two sections are resistors 65*a* and 65*b* of equal value, connected together at the point 67. From this junction-point a common resistor 69 completes the circuit to ground. As is well understood, the voltage across resistor 69 is proportional to the sum of the potentials supplied to the grids of the two triode sections.

The resulting signal is that recorded. The voltage across resistor 69 is applied through a blocking condenser 71 to the grid of a cathode follower tube 73. The grid of this tube is maintained, on the average, at ground potential through grid resistor 75. The output voltage is taken off across cathode resistor 77 and applied through blocking condenser 79 to a recording transducer head 81 for application to the recording tape, symbolically indicated by the reference character 83.

Figure 4:
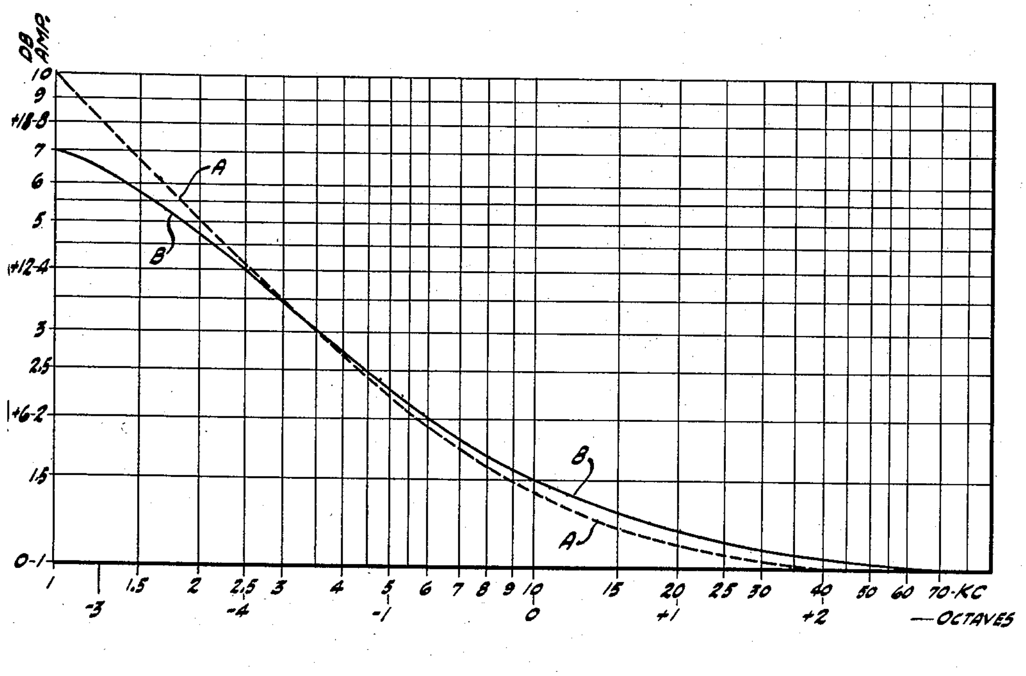
Fig. 4 is a graph, plotted logarithmically, showing the variation of gain with frequency of compensating apparatus used in accordance with this invention.

As stated at the outset of the foregoing description, the apparatus thus described will, over its designed range, give a close approximation to complete compensation over a low-frequency range of a few octaves. This is illustrated by Fig. 4 of the drawings. Curve A of this figure, plotted on a logarithmic scale of both abscissas and ordinates, shows the relative variation in impedance of the compensating circuit required to give theoretically perfect correction, whereas curve B illustrates the actual impedance of the circuit over the frequency range comprised in the diagram. Two scales are provided for both abscissas and ordinates; the upper scale of abscissas gives frequencies in kilocycles, from 1 to 100, while the lower scale indicates octaves above and below the cutoff frequency of 10 kilocycles. The ordinate scales read, respectively, relative impedance and decibel gain in the compensating circuit. At frequencies below those shown on the figure, curve A continues to rise at an angle of 45°, or 6 db per octave, whereas curve B levels off and eventually becomes horizontal. At frequencies above those shown in the diagram both curves level off to a value of substantially unity. Curve B is plotted for values of 2,000 ohms for resistor 35 and 16,000 ohms for resistor 37.

Figure 2:
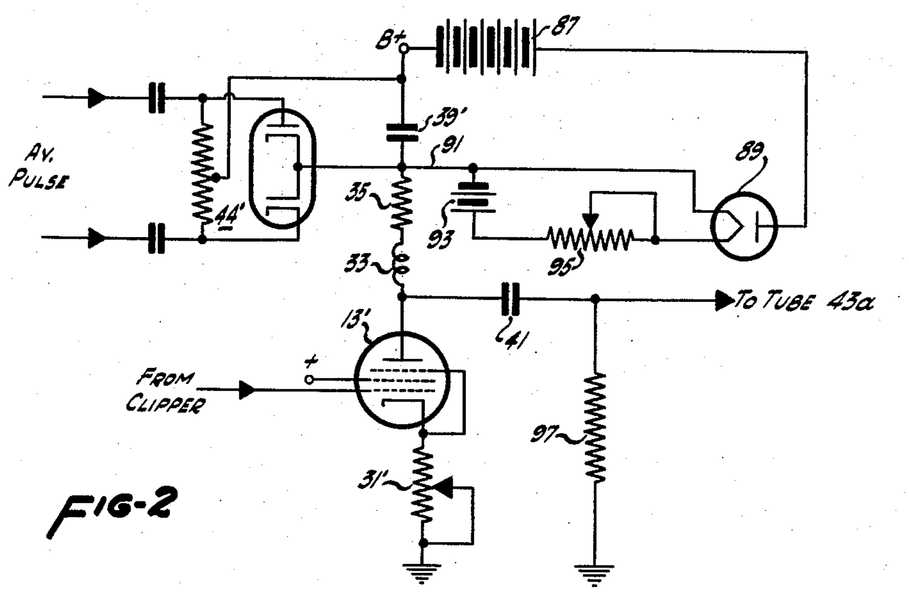
Fig. 2 is a schematic diagram of a modified form of compensating circuit which can be substituted for elements of Fig. 1.

As is evident from the curve of Fig. 4, the equipment shown in Fig. 1 will give a very close approximation to the theoretical curve A over a low-frequency range of 3 octaves or somewhat more. By substituting somewhat more complex apparatus for tube 13 and its associated circuits, theoretically complete compensation may be attained over an indefinitely wide range without overtaxing the tube. Since it is only tube 13 and its immediate connections, as enclosed in the dotted line D of Fig. 1, that differ from the arrangement there shown, Fig. 2 is limited to this portion of the circuit, the remainder being identical with Fig. 1. Those portions of the circuitry which are the same in both construction and operation as those shown in Fig. 1 are identified by the same reference characters; those which are similar in function but differ in either construction or the way in which the function is exercised carry the same reference characters as in Fig. 1 distinguished by accents.

Tube 13′, like tube 13, is provided with a cathode resistor 31′, which differs from cathode resistor 31 only in being adjustable. Peaking coil 33 and resistor 35 are identical with the corresponding elements of Fig. 1, but condenser 39′, while the same in capacity as condenser 39, is necessarily (instead of optionally) connected directly to B+ instead of to ground.

Bridged around condenser 39′ is a clamp circuit 44′, which, as it may be identical with clamp 44, need not be described in detail. Its effective resistance should be as low as possible, however, since it must discharge a larger capacity than clamp 44. This clamp is operated by a pulse generated and timed in the same manner as that applied to clamp 44. When the clamp operates it discharges condenser 39′, bringing its two terminals to B+ potential.

Also bridged around condenser 39′ is a circuit comprising a potential source 87 (which may be included in the same high tension D.C. supply as is used to provide B+ potential but is illustrated separately for purposes of explanation) in series with a diode 89. Although this diode may be of the heater type it preferably is one using a filamentary cathode, one end of which connects back to the junction between resistor 35 and condenser 39′ through a lead 91. In this case the cathode is heated from a separate source 93 which connects from lead 91 back to the other end of the cathode through a filament-control resistor 95.

Diode 89 is operated at saturation; the source 87 is of high enough voltage to collect all electrons emitted from the cathode even when the latter is several volts positive to B+, as it may be in the operation of the device.

The resistor 95 is set so that the saturation current of tube 89 is substantially equal to the average space current of tube 13′, as set by the D.C. restorer and the clipper and the cathode resistor 31′ of tube 13′. A slight inequality here does no harm since it merely displaces the zero axis slightly. The adjustment may be made statically, since signals are supplied to the tube at a fixed level. Since the diode is saturated under all conditions of operation of tube 13′, its effective A.C. impedance is infinite. Tube 13′, however, draws a varying space current, in accordance with the voltage applied to its control grid. When the control grid swings negatively tube 13′ draws less current than is supplied to the condenser 39′ by the diode and therefore it charges positively, whereas, when the control grid swings positive with respect to its average potential condenser 39′ charges negatively. The condenser therefore integrates all components of the signals as supplied to tube 13 except when the clamp 85 is operated by the average-setting pulse, during which interval it discharges. A grid resistor 97 is provided for triode 43a in place of the clamp 44 of Fig. 1.

Figure 5:
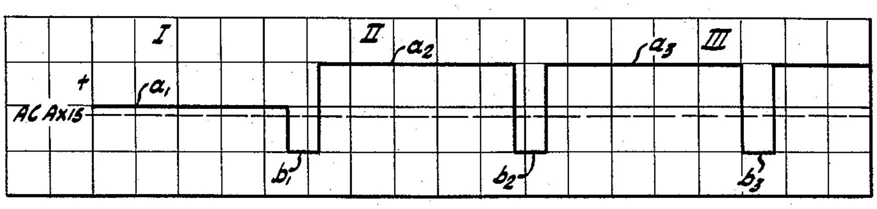
Fig. 5 is an idealized diagram of the voltage waveform of a portion of a television signal representing a step function of three scanning lines of uniform illumination, as supplied to the recording equipment.
Figure 6A:
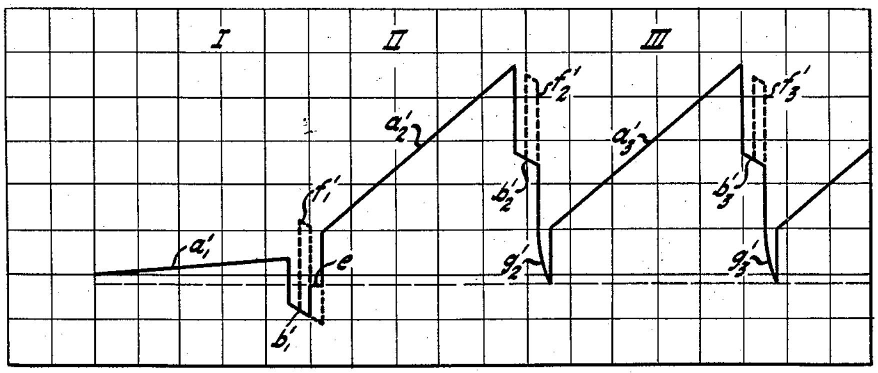
Fig. 6A is a similar idealized waveform diagram of the signal diagrammed in Fig. 5 after it has been operated on by the compensating circuit of Fig. 2, the polarity of the signal actually produced being reversed to permit direct comparison with Fig. 1.
Figure 7:
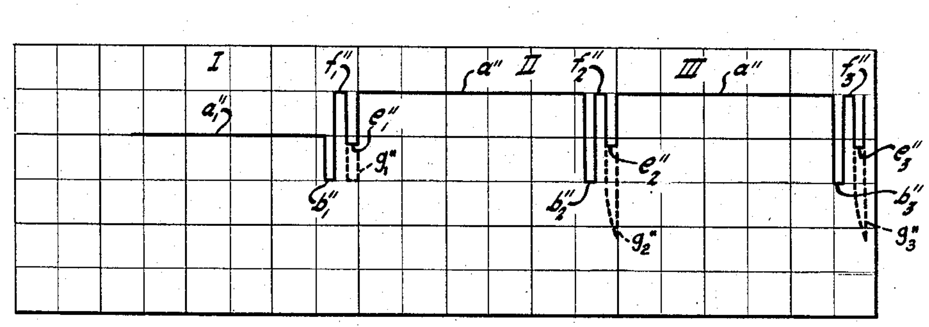
Fig. 7 is a diagram showing the waveforms of the preceding figures as they appear in the output of the playback amplifier.

How this equipment operates on the signals is illustrated in Figs. 5, 6A and 7, which are simplified wave forms of three scanning lines of the signals as applied to the input of the recording amplifier, to the recording transducer head, and as reproduced, respectively. The average light level of the picture field is assumed to be one-half that of maximum white, and line I is scanned at this level. At scanning lines II and III the light level suddenly jumps to maximum white. Since the visible signals, represented by the portions *a* of each line of Fig. 5 persist for about seven times as long as the blanking pulses *b*, the amplitude above the A.C. axis of the average-illumination signals of line I is only 1/7 of the amplitude of the blanking pulses below the A.C. axis.

At the beginning of line I the output voltage rises to the average background level, due to the drop through resistor 35. This increment of voltage persists throughout the line, but to it is added the voltage due to the charge accumulating on condenser 39′, giving a sloping waveform as shown at $a_1'$, of line I, Fig. 6A. Actually the polarity of the waveforms of Fig. 6A would be inverted as compared to those of Fig. 5, but they are shown with corresponding portions in the same direction to make their relationship clearer.

At the end of line I the decrease of current in resistor 35 drops the output voltage to the beginning of the portion $b_1'$, of line I (Fig. 6A), after which the condenser discharges, at seven times the rate it charged. Instead of the discharge continuing down the dotted portion of the negative slope, however, the clamp 44′ suddenly closes, bringing the voltage back, along the solid line, to the zero axis at *e′*. The white-level reference pulse $f_1'$, being added from a separate circuit, is shown dotted.

At the start of line II the illumination is doubled, and therefore, the increased drop in resistor 35 brings the start of portion $a_2'$ of this line twice as high above black level as for line I, and the slope is greatly increased—about 8 times, in fact. At the end of the line, however, the change in resistance-drop to the portion $b_2'$ of line II leaves the voltage level far above the zero axis, but the discharge of condenser 39′ occurs at the same rate as after line I. The pulse $f_2'$ is added, and then the clamp closes, discharging the condenser 39′ and generating a spurious pulse $g_2$ that has no counterpart in the signals but which brings the output voltage back to the A.C. axis so that line III starts from the same level as line II and duplicates its waveform, as shown. Since each line starts from the same level, its waveform is unaffected by anything that has preceded it.

A black line instead of a white one, approximately reverses the slope of the portions *a′* of the compensated waves, the slope being the same as the portions *b′*. The spurious pulse is reversed in sign going white instead of black. The signals reproduced from the wave forms of Fig. 6A are shown in Fig. 7. As far as the lines reproduced are concerned they are substantially identical with Fig. 5. In the blanking interval, however, there is first a 3 μsec. black pulse *b″* followed by a 3 μsec. white pulse *f″*. The spurious pulse *g″*, shown in dotted lines, is picked up by the transducer head, but is shorted out in the playback amplifier, as will be described, resulting in a "pulse" $e''$, 3 $\mu$sec. at the level of the A.C. axis.

Figure 6B:
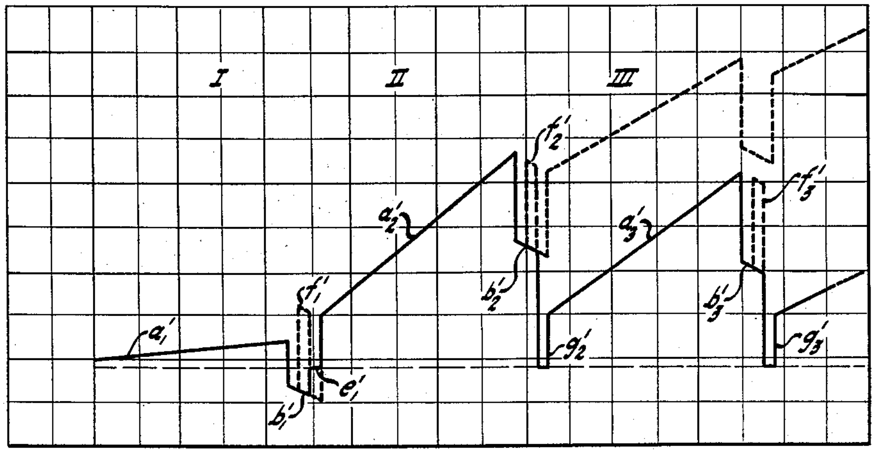
Fig. 6B is a similar diagram illustrating the waveforms of Fig. 5 after being operated on by the circuit of Fig. 1.

With the arrangement of Fig. 1 the result is nearly the same, as far as what reaches the tape is concerned. The voltage at the output of tube 13, however, is not brought back to the A.C. axis at the end of line II, but continues to climb, as indicated by the dotted lines of Fig. 6B. The resetting of the zero axis is done by clamp 44, at the input of the succeeding tube following the blocking condenser. The slope of the portions $a'$ of successive lines falls off gradually, giving less complete compensation at lower frequencies, but if the time constant of the restorer circuit is relatively short, so that the A.C. axis of the input signal varies to compensate for the lowest frequencies this may not be a serious disadvantage. The circuit of Fig. 1 has the advantage that since there is a much smaller capacity to be discharged than with the arrangement of Fig. 2 it is not as important that the resistance of clamp 44 be kept low as is the case with clamp 44'.

With either arrangement maximum magnetization of the tape rises by about 3.4 times the maximum that it would without the low-frequency compensation, provided the cut-off is at 10 kc. as assumed. This is between 12 and 13 db, but because low frequency components are practically never either maximum white or maximum black the effective loss of dynamic range is perhaps ½ to ⅔ the theoretical maximum. Without the resetting of the A.C. or zero axis at the end of each line, compensation down to lower frequencies results in increasing sacrifice of dynamic range; at 1 kc. the magnetization of the tape would be 10 times that without compensation and down to 100 cycles 100 times as great, leaving nothing for higher frequency components.

The lower the cut-off of the playback apparatus the less will be the loss of dynamic range of the tape. Thus, if the playback cut-off is at 2000 cycles instead of 10,000, as it may be under certain circumstances, the condenser 39 or 39' can be of 0.0016 $\mu$f. capacity. In this case the magnetization of the tape will increase only by 1.68 times that without compensation, with a theoretical total decrease in dynamic range of only 4.5 db.

The lower limit of dynamic range is the noise level, as the upper limit is saturation effects. With relatively noise-free tapes the playback compensation can be carried to lower frequencies; with tapes capable of high magnetization without exhibiting saturation effects the recording compensation can be carried to higher frequencies. The choice of cutoff or cross-over frequency therefore depends largely on the characteristics of available tapes.

Figure 3:
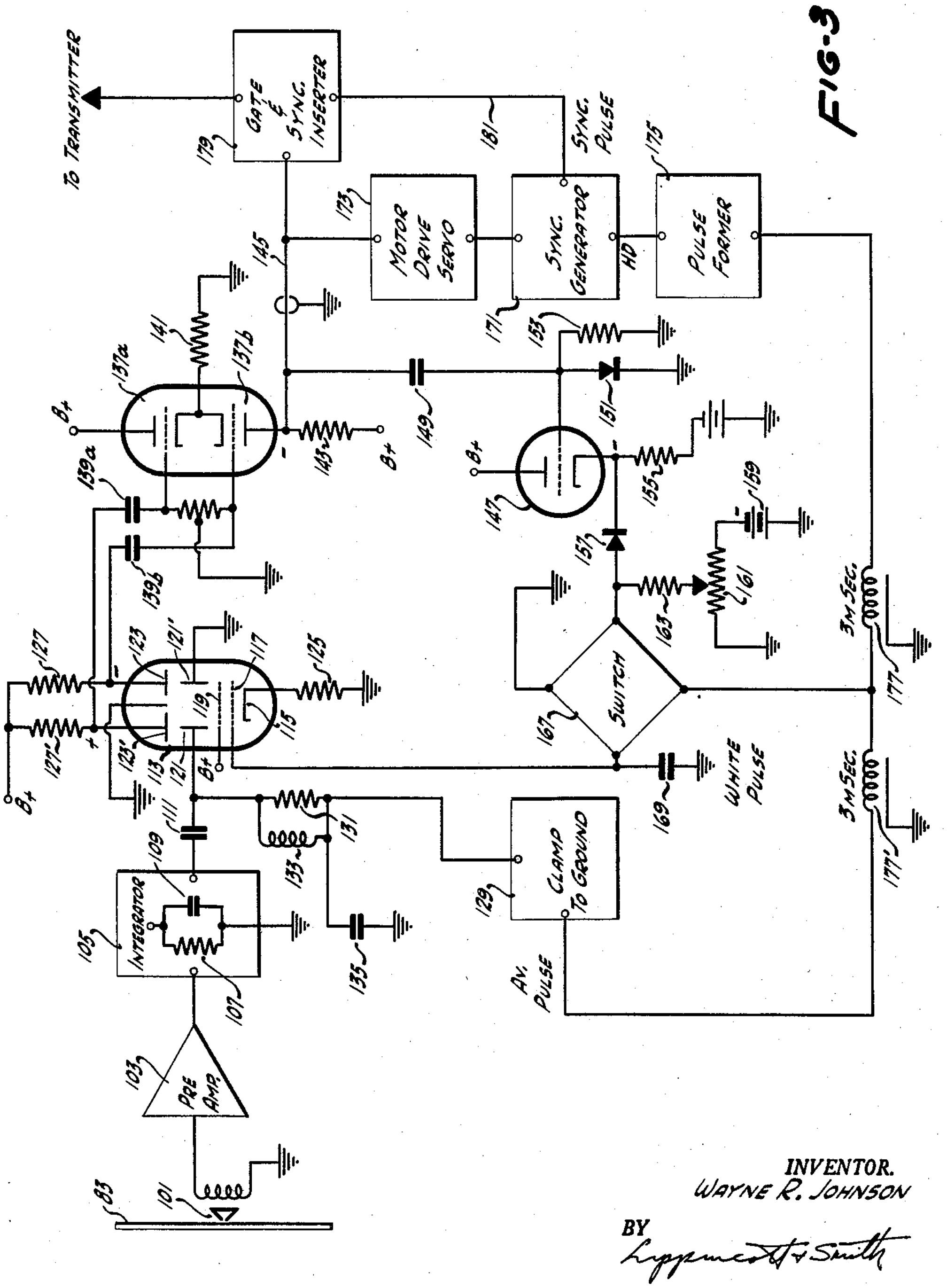
Fig. 3 illustrates a form of playback amplifier adapted for use with the recording amplifiers of Fig. 1 or 2 to accomplish certain steps of the method of this invention.

A preferred type of equipment for playing back the signals recorded in either manner described is illustrated in Fig. 3. The magnetized tape 83, upon which the signal has been recorded, is progressed past the pickup transducer head 101 by equipment substantially identical with that used in recording. Signals thus developed are supplied to a pre-amplifier 103, which is adapted to pass signals up to the cutoff frequency, 2 mc. in the illustrative case. The pre-amplifier may, itself, include all or part of the playback integrating equipment, but for purposes of this explanation the integrating high frequency equalizing circuits are shown as a separate integrating circuit included in the block 105.

As is well known, the high frequency cutoff of ordinary resistance-capacity coupled amplifiers is that due to the distributed capacity of the tubes and other equipment involved. The amplification of the lower frequencies, where the shunt susceptances are small, is determined by the shunt resistors in the circuit, the stray capacities being effectively in parallel with these resistors. Effectively both the various resistors and the capacities of all stages may be considered as all being in parallel, due account being taken of the impedances of the various circuits across which the elements are connected. Effectively, therefore, these various capacities and resistors are equivalent to a circuit of the type shown within the box 105, comprising a resistor 107 in parallel with a capacitor 109. In order to accomplish the integration with which the higher frequencies are equalized, the time constant of this effective circuit should be made equal to that of the circuit comprising resistor 35 and condenser 39 or 39' of the recording equipment. If, with the resistors used, the effective time constant is too small, either the amplifier or the equalizing circuits may be loaded with capacity or the resistors may be increased to bring it to the right value. These time constants, it should be noted, include those of the equipment which follows the pre-amplifier as well as those circuit elements included in it.

Following the pre-amplifier with its equalizing circuits the equipment is shown schematically. The developed signals are applied through a blocking condenser 111 to one deflecting element of a deflector-type amplifier tube 113.

This tube comprises a cathode 115, a control grid 117, and a screen grid 119, which together form, effectively, an electron gun which directs an electron beam between a pair of deflecting plates, 121 and 121', and onto a pair of anodes 123, 123', between which the undeflected beam divides substantially equally. The input signal is applied to deflecting plate 121 while the plate 121' is grounded.

Cathode 115 connects to ground through a biasing resistor 125. A positive potential is applied to the screen grid 119 from a suitable source, and the two similar anodes connect to B+ through load resistors 127 and 127'.

One tube of the type thus described is available commercially under the trade number, "6AR8." When undeflected, the beam of electrons from the cathode 115 divides equally between anodes 123 and 123', causing equal drops in the two load resistors. When deflected, as by a negative charge on plate 121, toward anode 123, the drop in resistor 127 increases while that in resistor 127' decreases, the amount of increase or decrease for a given angle of deflection being dependent upon the intensity of the beam as controlled by the voltage on the grid 117. The amplification is substantially linear irrespective of beam intensity, so that control of the tube gain does not introduce nonlinearity in the signals.

Plate 121 is periodically biased to ground potential at the end of each scanning line at the instant of occurrence of the recorded "average pulse." This is accomplished by means of a clamp 129, which may be identical with the clamp 44 of Fig. 1. Included in the lead from plate 121 to the clamp, however, there is shown a low-pass filter comprising a resistor 131 in parallel with a small inductor 133, the clamp side of the parallel arrangement being grounded through a condenser 135, also very small. The function of this arrangement is to filter out noise frequencies and thus insure that the grid is grounded at the average or zero level, since if there is a noise peak at the instant of grounding the zero axis may be clamped at a false value. With either type of recording the operation of the clamp effectively shorts out the spurious pulse that results from the resetting of the zero axis in recording. The equipment for supplying the average-setting pulse to the clamp 129 will be described hereinafter.

Voltage across the two anode resistors 127, 127' is applied, respectively, to the two grids of a dual triode **137*a*, 137*b*, through blocking condensers 139*a*, 139*b*, respectively. The two triode sections are connected as a differential amplifier, their cathodes being connected to ground through a resistor 141 of relatively high resistance in comparison with the dynamic resistance of the two triode sections. The anode of section 137*a* is connected directly to B+; the anode of section 137*b* connects to B+ through a load resistor 143 and also to output lead 145**.

The differential amplifier thus described is one of several known in the art, any one of which may be employed for the present purpose. It amplifies the alternating components of the signal with a high degree of linearity, its output being proportional to the difference in potential between the two anodes 123, 123'.

A feedback loop connects from the output lead 145 back to the grid 117 of tube 113. This loop comprises a cathode-follower tube 147, the grid of which connects to lead 145 through a blocking condenser 149. A D.C. restorer comprising a rectifier 151 shunted by a high resistance 153 connects from the grid of tube 147 to ground, the rectifier 151 being poled to pass positive pulses and thus charge condenser 149 negatively. It may be noted that since the signals supplied to the amplifier contain both positive and negative pulses it makes no difference at which polarity they are supplied to tube 147, but what is important is that the rectifier 151 be poled to bias the grid to ground level at the positive limit of its swing so that all variations in grid potential are negative with respect to ground. It is assumed here that the black-level pulses are positive and the white-level pulses negative but a reversal of signal polarity anywhere ahead of tube 147 would make no difference in operation.

The output of tube 147 is taken across the cathode resistor 155 which is connected to a negative potential source. The output lead from this resistor includes, first, a clipping rectifier 157, poled to pass negative signals but biased negatively to prevent the passage of signals of less than a predetermined amplitude. The biasing circuit may comprise a source 159 of relatively low voltage having its positive terminal connected to ground and its negative terminal connected to a potentiometer 161 and thence back to ground. The movable contact of the potentiometer connects through a resistor 163 back to the output side of rectifier 147. From the biasing circuit that portion of the output signal which passes the clipping rectifier is supplied to an electronic switch 167 (which may be identical with that shown at 59 of Fig. 1, but is symbolically indicated since it may be of any conventional type) and thence to a storage condenser 169, shunted to ground. The charge on this condenser biases the grid 117, completing the feedback loop.

Pulses for operating the clamp 129 and the switch 167 are preferably ultimately derived from a sync generator 171. There have elsewhere been described methods of controlling the velocity of the tape 83 to maintain it at a constant average value and to tie-in the repetition frequency of the blanking pulses with the sync generator through a motor-drive servo-mechanism indicated symbolically at reference character 173. This arrangement therefore need not be described in detail. As in the case of the recording equipment, the horizontal-drive pulses from the sync generator are supplied to a pulse former 175 and thence through two successive 3 microsecond delay line sections 177 and 177'. Although, in theory, it makes no difference at which polarity the signals are fed to the feedback loop, it does make a difference with regard to the order in which the switch 167 and clamp 129 are operated, and the connections shown are those required if the white pulses are negative. The plus and minus signs shown adjacent to the various terminals of the amplifying elements which carry signal frequencies indicate the polarity of the white pulses.

In the operation of this arrangement the potentiometer 161 is set to supply a bias on rectifier 157 equal to the desired voltage, at this point, of the white pulses with respect to ground. Rectifier 157 will therefore pass only such portions of the signal as exceed the bias in value, and furthermore it can pass these pulses only during the white level pulse, when switch 167 is closed. Condenser 169 is small and resistor 163 and potentiometer 161 have relatively low value, so that the time constant of the circuit including the condenser and these resistances is small in comparison with the 3 microsecond period during which switch 167 is closed. The impedance of the cathode-follower circuit of tube 147 is low in comparison with the shunt path to ground offered by resistor 163 and potentiometer 161, and therefore can be considered as a substantially constant-voltage source.

During the period when switch 167 is closed and the white pulse is occurring, condenser 169 is therefore charged negatively to the value by which the white pulse exceeds the bias on the clipping rectifier 157, or, if the pulse is of lower value than the charge already on the condenser, the latter discharges through resistor 163 down to the actual value of the pulse. The gain around the feedback loop from the input plate 121 back to the grid 117 is high, tubes 113 and 137 both having quite high gains, so that, in accordance with well known feedback theory, very small changes in potential of the grid 117 have a large effect on the output of the amplifier and therefore the swing of the signals, from black to white level, is maintained at substantially constant value.

Before the signals from the output lead 145 are supplied to a television transmitter, transmission line or monitor, the white and average level pulses are gated out to restore the complete 9 microsecond blanking pulse and the synchronizing pulse is added from the sync generator. Since this involves well known techniques, equipment for this operation is symbolically indicated by block 179, the pulses being supplied from the sync generator 171 through lead 181.

It will be recognized by those skilled in the art that the two modifications of the recording equipment shown are merely illustrative of a number of ways in which the invention may be practiced. The forms of Figs. 1 and 2 may, in effect, be combined, the current-limiting circuit including diode 89 being replaced by a resistor which will give a long time constant in combination with condenser 39', supplied by a sufficiently high voltage to pass the average current demanded by tube 13'. This permits the extension of the compensation frequencies far below those practical with the form of apparatus used in Fig. 1, with a correspondingly closer approximation to curve A of Fig. 4. Actually the compensation is better than would be indicated by the time constant of the circuit, for the condenser is discharged before the voltage across it can build up enough to make any material difference in the current drawn through the resistor. Such an arrangement requires a somewhat higher anode supply voltage, however, and the resistor must be capable of relatively high power dissipation if it is to be an order of magnitude higher than those considered in connection with Fig. 1 and still carry average anode current for the tube 13'. However, with a 200,000 ohm resistor replacing diode 89, using a 6J7 pentode as tube 13' and a 400 volt source 87 to supply the tube with its rated 2 ma. plate current, the maximum departure from theoretical complete compensation will be in the neighborhood of 2%, even as to any D.C. component recorded, and as this is spread over an entire line it is visually undetectable.

Figure 8:
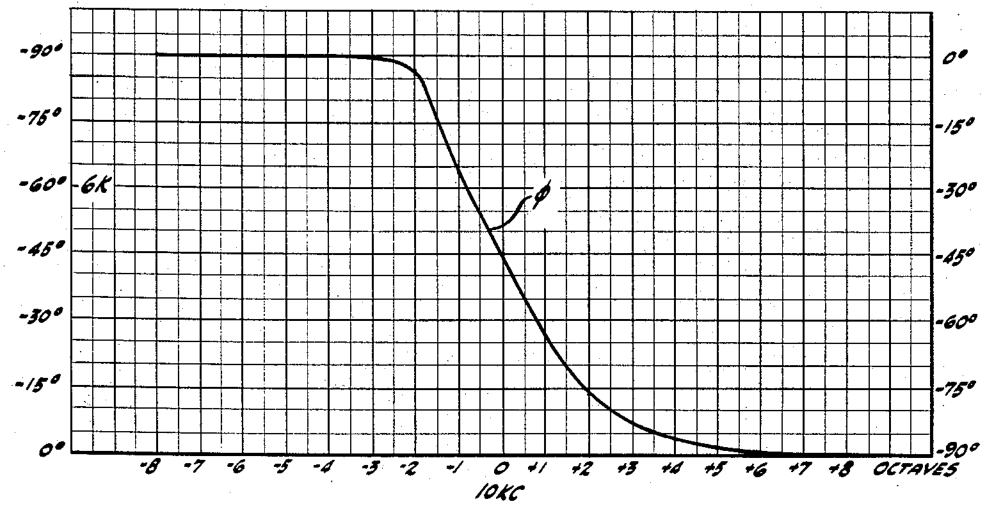
Fig. 8 is a graph indicative of the phase rotation of various component frequencies effected by the recording and playback amplifiers respectively.

In the method as applied by the equipment of Fig. 2, the invention is capable of providing complete phase correction as well as amplitude correction. This is illustrated in Fig. 8, which shows the rotation of phase in voltage, relative to input voltage, of the compensating circuit of the recorder and of the playback amplifier equalizer as symbolized by block 105 of Fig. 3. The scale of abscissas is logarithmic and is graduated in octaves above and below the cutoff frequency of 10 kilocycles. The ordinate scale to the left of the figure is degrees of phase rotation introduced by the compensator in recording, whereas the ordinate scale to the right of the figure, reading downward, is the phase rotation introduced by the playback. In each case it will be seen that the sum of the two rotations is equal to $-90°$, the rotation of the 10 kilocycle cutoff being 45° for both recording and playback. The sum of these two rotations exactly compensates the 90° advance in phase due to the differentiation effected in the playback transducer itself. Where the compensating circuit shown in Fig. 1 is employed this complete compensation is not quite achieved, the rotation in recording being slightly less than that shown in the curve, but experience has shown that within the limits where the type of compensation employed in Fig. 1 is used no perceptible phase distortion is noticeable in the reproduced signal. If the modification of the circuit suggested immediately above is used, the compensation introduced will be intermediate between that shown in curves A and B of Fig. 4, but much closer to curve A.

Numerous other types of playback amplifier than that disclosed in Fig. 3 may also be employed, the essential features in this figure being the clamp 129 or equivalent device for resetting the zero axis of the reproduced signals during each blanking interval by shorting out the spurious pulses introduced in the recording. The clamp may be any type of low impedance electronic switch, such as that shown at 59 of Fig. 1, or any of numerous types of gating circuits. It is not necessary that the resetting be done on the zero axis itself; the signals can be clamped at the black level and the clamp operated by the blanking pulse itself instead of by a shorter average-level pulse, and the white pulse can also be omitted, with the sacrifice of the particular type of automatic gain control shown. Where average or white pulses are used they may be inserted in different order. The method is one that permits of a high degree of flexibility, and the invention is therefore not intended to be limited in scope by the particular apparatus shown, all intended limitations being set forth in the following claims:

I claim:

1. The method of magnetically recording electrical waves for subsequent reproduction which comprises the steps of integrating said waves to produce waves of related waveforms, periodically interrupting the integration and returning the instantaneous value of the related waves to a reference value, and producing a recording of the related waves.

2. The method of magnetically recording and reproducing electrical waves which comprises the steps of integrating said waves to produce waves of related waves, periodically interrupting the integration and returning the instantaneous value of the related waveform to a reference value, producing a recording of the related waves, playing back the waves so recorded to produce new waves substantially proportional to the rate of change of the recorded waves, and removing from said new waves spurious pulses representative of the rate of change of said related waves in returning to said reference value.

3. The method of magnetically recording and reproducing electrical waves which comprises the steps of integrating said waves to produce waves of related waveforms, periodically interrupting the integration and returning instantaneous value of the related waves to a reference value, producing a recording of the related waves, playing back the waves so recorded to produce new waves substantially proportional to the rate of change of the recorded waves, and shorting out of said new waves spurious pulses resulting from the return of said related waves to said reference value.

4. The method of magnetically recording and reproducing electrical waves which comprises the steps of developing an electrical current having an alternating component whose waveform is substantially that of the waves to be recorded and reproduced, storing said component of current for fixed equal intervals to accumulate charges having voltages substantially proportional to the integrated values of said component of current in said intervals, discharging said charges at the end of each of said intervals, producing a recording of the waveforms resulting from the successive accumulation and discharge of said charges, playing back the recorded waveforms to produce waves substantially proportional to the rate of change of the recorded waveforms, and removing from said last mentioned waves spurious pulses produced by the discharge of said charges.

5. The method of magnetically recording and reproducing electrical waves which comprises the steps of developing an electrical current having an alternating component whose waveform is substantially that of the waves to be recorded and reproduced, storing said component of current for fixed equal intervals to accumulate charges having voltages substantially proportional to the integrated values of said component of current in said intervals, discharging said charges at the end of each of said intervals, adding to the voltages of said charges as they accumulate voltages proportional to the instantaneous values of said electrical current to produce resultant waveforms, producing a recording of said resultant waveforms, playing back the recorded waveforms to produce waves substantially proportional to the rate of change of the recorded waveforms, and removing from said last mentioned waves spurious pulses produced by the discharge of said charges.

6. The method of magnetically recording and reproducing television and like signals wherein the frequencies to be reproduced are interspersed at regular intervals with pulses representative of a reference level, which comprises the steps of partially integrating said signals during the intervals between said pulses, resetting the zero axis of the partially integrated signals during each of said pulses to return the integrated portion thereof to zero, magnetically producing a recording of the resultant waves, translating the magnetic recording into electrical signals, deriving from the said electrical signals waves substantially proportional to the first derivative with respect to time of the components of the recorded waves, removing from the derived waves during the reference-level pulses therein spurious pulses resulting from resetting the zero axis of the waves to be recorded and completing the integration of the derived waves to reproduce substantially the original signals.

7. The method of magnetically recording and reproducing television and like signals wherein the frequencies to be reproduced are interspersed at regular intervals with pulses representative of a reference level, which comprises the steps of developing from the original signals waves substantially proportional to the sum of said original signals and the time integral thereof during the intervals between said pulses resetting the zero axis of the waves thus developed during each of said pulses to return the integrated portion thereof to zero, magnetically producing a recording of the resultant waves, translating the magnetic recording into electrical signals, deriving from the said electrical signals waves substantially proportional to the first derivative with respect to time of the components of the recorded waves, removing from the derived waves during the reference level pulses therein spurious pulses resulting from resetting the zero axis of the wave to be recorded and developing from the derived waves signals substantially proportional to said original signals.

8. The method of recording and reproducing television and like wideband-signals including both relatively high frequency and relatively low frequency components interspersed with pulses representative of a reference amplitude level, which comprises developing from said signals electrical waves the lowest frequency components whereof are substantially proportional in amplitude to the time integral of corresponding components of said signals in the intervals between said reference pulses and the highest frequency components are substantially proportional in amplitude to the highest frequency components of said signals, resetting the instantaneous value of the electrical waves so developed to a fixed level during each of said reference level pulses, magnetically producing a recording of the waves so developed, playing back the magnetic recording to produce electrical waves corresponding to those recorded, and clamping the electrical waves produced from the played-back waves at a fixed level during the time of occurrence of the reference level pulses therein to remove therefrom spurious pulses.

9. The method of magnetically recording and reproducing television and like signals wherein the frequencies to be reproduced are interspersed at regular intervals with pulses representative of a reference level, which comprises the steps of partially integrating said signals during the intervals between said pulses, resetting the zero axis of the partially integrated signals during each of said pulses to return the integrated portion thereof to zero, magnetically producing a recording of the resultant waves, translating the magnetic recording into electrical signals, deriving from the said electrical signals waves substantially proportional to the first derivative with respect to time of the components of the recorded waves, removing from the derived waves during the reference level pulses therein spurious pulses resulting from resetting the zero axis of the waves to be recorded, and completing the integration of the derived waves to reproduce the original signals.

References Cited in the file of this patent

UNITED STATES PATENTS

| | | |
|---|---|---|
| 2,190,753 | Browne | Feb. 20, 1940 |
| 2,307,375 | Blumlein | Jan. 5, 1943 |
| 2,698,875 | Greenwood | Jan. 4, 1955 |

UNITED STATES PATENT OFFICE
CERTIFICATE OF CORRECTION

Patent No. 2,913,520 November 17, 1959

Wayne R. Johnson

It is hereby certified that error appears in the printed specification of the above numbered patent requiring correction and that the said Letters Patent should read as corrected below.

Column 15, line 41, for "waves", third occurrence, read -- waveforms --; line 43, for "waveform" read -- waves --; line 54, before "instantaneous" insert -- the --.

Signed and sealed this 2nd day of August 1960.

(SEAL)
Attest:

KARL H. AXLINE
Attesting Officer

ROBERT C. WATSON
Commissioner of Patents